United States Patent [19]

Ohlsen et al.

[11] Patent Number: 5,459,125

[45] Date of Patent: Oct. 17, 1995

[54] CORROSION INHIBITOR COMPOSITION AND METHOD OF USE

[75] Inventors: James R. Ohlsen, Ventura, Calif.; J. Michael Brown, The Woodlands, Tex.; Gene F. Brock, Oxnard; Veena K. Mandlay, Newbury Park, both of Calif.

[73] Assignee: BJ Services Company, Houston, Tex.

[21] Appl. No.: 96,072

[22] Filed: Jul. 22, 1993

[51] Int. Cl.$^6$ .................................................... C09K 7/00

[52] U.S. Cl. .................. 507/129; 507/130; 507/133; 507/136; 507/138; 507/939; 507/920

[58] Field of Search ...................... 252/8.555, 389.54, 252/392, 394, 8.554; 422/12, 16, 17; 507/939, 920, 129, 130, 133, 136, 138

[56] References Cited

U.S. PATENT DOCUMENTS

| | | | |
|---|---|---|---|
| 2,736,658 | 2/1956 | Pfohl | 106/14.27 |
| 3,629,104 | 12/1971 | Maddox | 252/8.555 |
| 4,994,195 | 2/1991 | Edmondson et al. | 507/224 |
| 4,995,987 | 2/1991 | Whitekettle | 252/394 |
| 5,027,901 | 7/1991 | French et al. | 166/310 |
| 5,062,992 | 11/1991 | McCullough | 252/394 |
| 5,064,612 | 11/1991 | Edmondson et al. | 422/12 |
| 5,084,210 | 1/1992 | Teeters | 252/392 |
| 5,104,578 | 4/1992 | McCullough | 252/394 |
| 5,322,630 | 6/1994 | Williams et al. | 252/8.553 |

OTHER PUBLICATIONS

HCA Acc. No. 108:135919.
HCA Acc. No. 103:107218.
HCA Acc. No. 116:217946.
HCA Acc. No. 76:61594.
HCA Acc. No. 84:182331.
HCA Acc. No. 105:194397.
Prues, W., et al., "Chemical Mitigation of Corrosion by Chlorine Dioxide in Oil Field Water Floods", Materials Performance, May 1985.

Primary Examiner—Gary L. Geist
Assistant Examiner—Valerie Fee

[57] ABSTRACT

A composition and method for inhibiting corrosion by chlorine dioxide in oil field water flood systems are disclosed. The composition is comprised of an alcohol, an acid, a fatty imidazoline, an ethoxylated fatty diamine, and water. This composition has proven more effective than chromates at inhibiting the corrosion caused by chlorine dioxide, further without the serious toxicological effects caused by the use of chromates.

7 Claims, No Drawings

CORROSION INHIBITOR COMPOSITION AND METHOD OF USE

FIELD OF THE INVENTION

This invention relates to a composition and method for inhibiting the corrosion of mild steel under strong oxidizing conditions. These conditions are encountered in situations such as when chlorine dioxide is fed for microbial control to aqueous systems suffering from such.

BACKGROUND OF THE INVENTION

Removal of petroleum oil from the ground includes cycling and recycling water in order to generate flood conditions commonly called oilfield waterfloods. This augments oil output from a well. Water used in such systems contains undesirable sulfide compounds, such as hydrogen sulfide and sodium sulfide. Also present are organisms which feed upon the sulfate present in the water. These organisms are commonly referred to as sulfate reducing bacteria (SRB). Excessive generation of both the sulfides and sulfate reducing bacteria results in an undesirable contamination problem.

Presently, chlorine dioxide is commonly used to control excessive buildup of sulfide and sulfate reducing bacteria in these systems. This compound is generated on-site and is usually slug-fed. However, one serious drawback to this treatment method is the fact that chlorine dioxide is very corrosive to the various metals used in oil field processing system equipment. Consequently, numerous attempts have been made to control chlorine dioxide induced corrosion in these systems. Presently, the most effective and most commonly used corrosion inhibition program includes the addition of chromates.

In order to minimize corrosion of carbon steel equipment in an oilfield waterflood system, sodium bichromate is fed concurrently with the chlorine dioxide. However, chromates are coming under increasing scrutiny due to their unacceptable toxicity. At present, one state, California, has already restricted the use of chromium due to its toxic effect on the environment.

It has therefore become necessary to develop a composition which will provide the desirable attributes of inhibiting the corrosion of metallic surfaces caused by the presence of chlorine dioxide without the toxic side effects of the previously described chromate systems.

SUMMARY OF THE INVENTION

The present inventors have shown that a composition of an aqueous solution of an alcohol, an acid, a fatty imidazoline and an ethoxylated fatty diamine proves effective at inhibiting corrosion in aqueous systems used in conjunction with the petroleum industry.

DESCRIPTION OF THE RELATED ART

In the May 1985 issue of the periodical, Materials Performance, in an article by Prues, et al. entitled, Chemical Mitigation of Corrosion by Chlorine Dioxide in Oil Field Water Floods, the effect of chlorine dioxide as a bacteriocide useful in the treatment of controlling sulfate reducing bacteria from these environments is disclosed. The authors also discuss the corrosive effect that chlorine dioxide has on the metallic processing equipment. They advise that an effective chlorine dioxide program should also take into account chlorine dioxide corrosion inhibition. Testing was conducted with multiple inhibitors. In general, chromate yielded the best results at $ClO_2$ inhibition.

DETAILED DESCRIPTION OF THE INVENTION

The present invention is directed for use in water systems, especially water handling systems in the petroleum industry known as oilfield waterfloods. In these systems, sulfate reducing bacteria (SRB) and sulfides are present. In order to contain their proliferation, chlorine dioxide is added for this purpose. However, chlorine dioxide is highly corrosive to the metallic components used in oilfield equipment. Chromates have been and are recognized as successful chlorine dioxide corrosion inhibitors. However, chromates are also undesirable because of their high toxicity.

The present invention provides a more effective chlorine dioxide corrosion inhibitor than conventional and potentially toxic chromate treatment programs. It has been found that the addition to the water system of an aqueous composition of an alcohol, an acid, a fatty imidazoline and an ethoxylated fatty diamine provides superior corrosion inhibiting properties.

The preferred composition comprises 22% water, 20% diethylene glycol monobutyl ether, 10% acetic acid, 24% tall oil fatty acid substituted imidazoline and 24% tallowdiamine with 10 moles ethylene oxide (an ethoxylated fatty diamine). The entire formulary is commercially available from Betz Energy Chemicals as EXC-611.

The alcohols useful in this invention are those that are water-soluble. Preferably, these alcohols are diethylene glycol monobutyl ether, butanol, butyl cellusolve, isopropanol, methanol, propylene glycol, 2-ethylhexanol, hexylene glycol, and glycolic acid.

The acids useful in this invention can be either organic or inorganic acids, preferably acetic acid or orthophosphoric acid. The inventors anticipate that fatty-substituted organic acids, glycolic acid and mono-, di-, or tricarboxylic acids or mixtures thereof will also be effective in the present invention.

The tall oil fatty substituted imidazolines are preferably those formed by reacting a tall oil fatty acid and a polyamine (such as diethylenetriamine) in a reaction such as that disclosed in U.S. Pat. No. 5,062,992, which disclosure is wholly incorporated by reference herein.

Zinc or molybdate, derived from their respective salts, may optionally be used with the above formulation. The acid component may also be optionally substituted by a fatty acid dimer or trimer.

The total amount of the combined treatment used in the methods of the present invention is that amount which is sufficient to inhibit corrosion in the aqueous system and will vary due to the conditions of the aqueous system.

Preferably, the total amount of the combined treatment may be added to the aqueous system in an amount ranging from about 1 part per million to about 1000 parts per million based on the amount of water to be treated. Most preferably, the total amount of the treatment is from about 5 to 100 parts per million parts water.

The combined treatment can be added to the water by any conventional method. The components can be added separately or as a combination. It is preferred to add the composition as a single treatment composition.

The data set forth below were developed and demonstrate the unexpected results occasioned by use of the invention.

The following examples are included as being illustrations of the invention and should not be construed as limiting the scope thereof.

EXAMPLES

Tests were performed to measure corrosion rate (C.R.) by linear polarization resistance (LPR) utilizing an EG & G potentiostat. After equilibration, LPR measurements are taken until stable readings are obtained. The treatment is added and allowed to equilibrate for one hour. $ClO_2$ is then added at a dosage of 55 ppm and time is set at zero. LPR measurements are taken versus time.

The condition of the 600 g of synthetic brine that was used in the evaluation were as follows:

29.8 ppm $K^+$
6596 ppm $Cl^-$
4231 ppm $Na^+$
249 ppm $Mg^{+2}$ (as $CaCO_3$)
476 ppm $Ca^{+2}$ (as $CaCO_3$)
102 ppm $SO_4^{-2}$ This brine was saturated with $CO_2$, pH 5.8 at 100° F.

TABLE I

| Blank C.R. (mpy) | Time (min.) |
|---|---|
| 77 | — |
| 81 | 25 |
| 85 | 1042 |

| 50 ppm EXC-611 | | 50-ppm EXC-611 | | 50 ppm EXC-611 | |
|---|---|---|---|---|---|
| C.R. | Time | C.R. | Time | C.R. | Time |
| 88 | BT | 79 | BT | 77 | BT |
| 19 | AT | 4 | AT | 12 | AT |
| 36 | 67 | 38 | 70 | 37 | 50 |
| 36 | 990 | 36 | 1075 | 16 | 1062 |

| 50 ppm EXC-611 | | 50 ppm EXC-611 | |
|---|---|---|---|
| C.R. | Time | C.R. | Time |
| 75 | BT | 78 | BT |
| 14 | AT | 18 | AT |
| 37 | 56 | 26 | 60 |
| 17.6 | 990 | 19 | 961 |

All corrosion rates are measured in mils per year (mpy).
Time minutes after addition of chlorine dioxide
BT = before treatment
AT = after treatment Testing was also performed with two other alcohol solvents. These results are presented in Table II.

TABLE II

| Solvent Changes in EXC-611 (50 ppm) | | | |
|---|---|---|---|
| N-Butanol | | Butylcellusolve | |
| C.R. | Time | C.R. | Time |
| 79 | BT | 75 | BT |
| 13 | AT | 12 | AT |
| 37 | 53 | 44 | 56 |
| 39 | 894 | 42 | 897 |

Further testing was performed utilizing the EXC-611 formulation with substitutions for the mixture of tall oil fatty acid substituted imidazolines. These results are presented in Table III.

TABLE III

| A | | B | | QDT-HG | |
|---|---|---|---|---|---|
| C.R. | Time | C.R. | Time | C.R. | Time |
| 75 | BT | 75 | BT | 76 | BT |
| 28 | AT | 77 | AT | 32 | AT |
| 27 | 66 | 88 | 67 | 74 | 67 |
| 21 | 1038 | 83 | 1010 | 77 | 1006 |

| PEG 400 DOT | | Witcamine 210 | |
|---|---|---|---|
| C.R. | Time | C.R. | Time |
| 77 | BT | 65 | BT |
| 2.5 | AT | 1 | AT |
| 21 | 43 | 94 | 19 |
| 10.6 | 960 | 68 | 1004 |

A is the reaction product of fatty acid propylenediamine, formaldehyde and tall oil fatty acid, B is the reaction product of butylene diol and polyethyleneamine.

QDT-HG is a quaternized tallow diamine, available from Exxon. PEG400 DOT is a reaction product of PEG400 and tall oil fatty acid, available from Glyco.

Witcamine 210 is alkylamidoamine, available from Witco.

Testing was also performed using EXC-611 and zinc. These results are reported in Table IV.

TABLE IV

| 50 ppm EXC-611 | | | |
|---|---|---|---|
| +5 ppm Zn | | +10 ppm Zn | |
| C.R. | Time | C.R. | Time |
| 74 | BT | 74 | BT |
| 10 | AT | 0.9 | AT |
| 32 | 70 | 94 | 47 |
| 16 | 975 | 62 | 641 |

Further testing was also performed with orthophosphoric acid as substitute for the acetic acid portion of EXC-611. These results are presented in Table V.

TABLE V

| 50 ppm EXC-611 with ortho-phosphoric acid subs, for acetic acid | |
|---|---|
| C.R. | Time |
| 70 | BT |
| 21 | AT |
| 26 | 67 |
| 17.5 | 1215 |

BT = before treatment
AT = after treatment

DISCUSSION

In oilfield waterflood systems chlorine dioxide is used to control sulfides and sulfate reducing bacteria. However, chlorine dioxide is also known as being very corrosive to metallic components uses in oilfield processing equipment. Conventional treatment programs utilized to control chlorine dioxide corrosion have included chromates, usually in the form of sodium bichromate. Although chromates are effective for this purpose they are highly toxic and they have also come under severe scrutiny in many states. In at least one state, California, their use is severely curtailed.

The instant invention solves the aforementioned problem by providing a treatment program exhibiting high chlorine dioxide corrosion control efficiency.

While this invention has been described with respect to particular embodiments thereof, it is apparent that numerous other forms and modifications of this invention will be obvious to those skilled in the art. The claims generally should be construed to cover all such obvious forms and modifications which are within the true spirit and scope of the present invention.

Having thus described the invention, what we claim is:

1. A method for inhibiting corrosion by chlorine dioxide of the metallic components of oilfield processing equipment in oilfield waterflood systems by adding to said oilfield waterflood systems a sufficient amount of a corrosion inhibiting composition comprising (A) diethylene glycol monobutyl ether, (B) acetic acid, (C) a tall oil fatty acid substituted with diethylenetriamine and (D) a tallowdiamine with 10 moles of ethyleneoxide.

2. The method as claimed in claim 1 wherein the weight ratio of A:B:C:D is about 20:10:24:24.

3. The method as claimed in claim 1 wherein the composition is in an aqueous solution.

4. The method as claimed in claim 2 wherein the remainder by weight is 22% water.

5. The method as claimed in claim 1 wherein said composition is added to said waterflood system in an amount ranging from about 1 to about 1000 parts per million parts water.

6. A composition for inhibiting corrosion by chlorine dioxide in oilfield waterflood systems comprising (A) diethylene glycol monobutyl ether, (B) acetic acid, (C) a tall oil fatty acid substituted with diethylenetriamine, (D) a tallowdiamine with 10 moles of ethylene oxide and (E) water.

7. The composition as claimed in claim 6 wherein the weight ratio of A:B:C:D:E is about 20:10:24:24:22.

* * * * *